US010560463B2

(12) United States Patent
Chattopadhyay et al.

(10) Patent No.: US 10,560,463 B2
(45) Date of Patent: *Feb. 11, 2020

(54) INCIDENT MANAGEMENT TO MAINTAIN CONTROL OF RESTRICTED DATA IN CLOUD COMPUTING ENVIRONMENTS

(71) Applicant: MICROSOFT TECHNOLOGY LICENSING, LLC, Redmond, WA (US)

(72) Inventors: Somak Chattopadhyay, Redmond, WA (US); Thomas Knudson, Salt Lake City, UT (US); Chetan Shankar, Redmond, WA (US); Maisem Ali, Redmond, WA (US); Lilei Cui, Redmond, WA (US); Sandeep Kalarickal, Redmond, WA (US); Pradeep Ayyappan Nair, Redmond, WA (US); Tom Keane, Redmond, WA (US); Siddhartha Pasumarthy, Redmond, WA (US); Shont Miller, Redmond, WA (US); Lu Jin, Redmond, WA (US); Qin Zhou, Redmond, WA (US); Maria Black, Redmond, WA (US); Elaine Lu, Redmond, WA (US); Damien Gallot, Redmond, WA (US); Christopher Geisbush, Sammamish, WA (US); David Sauntry, Redmond, WA (US); Peter Miller, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/933,803

(22) Filed: Nov. 5, 2015

(65) Prior Publication Data
US 2017/0134392 A1    May 11, 2017

(51) Int. Cl.
H04L 12/26    (2006.01)
H04L 12/28    (2006.01)
(Continued)

(52) U.S. Cl.
CPC ............ H04L 63/108 (2013.01); G06F 9/453 (2018.02); H04L 63/105 (2013.01); H04L 63/20 (2013.01)

(58) Field of Classification Search
CPC ............... H04L 9/00; H04L 9/32–3297; H04L 63/04–0492; H04L 63/08–0892;
(Continued)

(56) References Cited

U.S. PATENT DOCUMENTS 6,598,034 B1    7/2003    Kloth
6,615,240 B1    9/2003    Sullivan et al.
(Continued)

FOREIGN PATENT DOCUMENTS

EP    1881447 A1    1/2008

OTHER PUBLICATIONS

International Search Report and Written Opinion dated Feb. 6, 2017 in International Patent Application No. PCT/US2016/060591, 12 pages.
(Continued)

Primary Examiner — Kevin Bechtel
Assistant Examiner — Quazi Farooqui
(74) Attorney, Agent, or Firm — Shook, Hardy & Bacon LLP

(57) ABSTRACT

Techniques allow DevOps personnel to perform incident management for cloud computing environments in a manner that maintains control over restricted data and the data plane. The DevOps personnel do not have access to restricted data or the ability to modify the cloud computing environment to gain access to restricted data. The incident management
(Continued)

techniques include executing automatic operations to resolve an incident and allowing DevOps personnel to execute remote operations without providing the DevOps personnel access. A further incident management technique provides DevOps personnel with just-in-time (JIT) access that is limited to a certain level or type of access and limited in time. Still another technique for incident management is using an escort model, in which an escort session between operating personnel and DevOps personnel is established and connected to the cloud computing environment to allow the DevOps personnel access to the production environment while escorted by the operating personnel.

20 Claims, 10 Drawing Sheets

(51) Int. Cl.
  *G06F 15/173* (2006.01)
  *H04L 29/06* (2006.01)
  *G06F 9/451* (2018.01)
(58) Field of Classification Search
  CPC . H04L 63/10; H04L 63/1408; H04L 63/1416;
    H04L 67/12; H04L 63/108; H04L 63/105;
    H04L 63/20; H04L 12/26; H04L 12/28;
    G06F 15/16–18; G06F 21/00; G06F
    21/30–46; G06F 21/60–6; G06F
    17/30917; G06F 15/173
  USPC .................. 726/1–6; 370/228, 401; 709/239
  See application file for complete search history.

(56) References Cited

U.S. PATENT DOCUMENTS

| | | | |
|---|---|---|---|
| 8,396,838 B2 | 3/2013 | Brockway et al. | |
| 8,468,244 B2 | 6/2013 | Redlich et al. | |
| 8,498,941 B2 | 7/2013 | Felsher | |
| 8,537,663 B2* | 9/2013 | Poulson | H04L 45/22 370/228 |
| 8,613,041 B2 | 12/2013 | Hopen et al. | |
| 8,707,397 B1* | 4/2014 | Wilkinson | G06F 9/465 726/4 |
| 8,984,644 B2* | 3/2015 | Oliphant | G06F 21/554 726/22 |
| 2002/0174333 A1* | 11/2002 | Harrah | G06F 21/62 713/166 |
| 2009/0281935 A1 | 11/2009 | Junger | |
| 2009/0287837 A1 | 11/2009 | Felsher | |
| 2010/0131755 A1 | 5/2010 | Zhu et al. | |
| 2010/0250497 A1 | 9/2010 | Redlich et al. | |
| 2011/0131306 A1* | 6/2011 | Ferris | G06F 9/5072 709/223 |
| 2011/0179271 A1 | 7/2011 | Orsini et al. | |
| 2012/0080520 A1 | 4/2012 | Kochevar | |
| 2012/0210399 A1 | 8/2012 | Jennings | |
| 2012/0317132 A1 | 12/2012 | Brady et al. | |
| 2013/0007527 A1* | 1/2013 | Petukhov | G06F 11/0793 714/37 |
| 2013/0133024 A1 | 5/2013 | MacLeod et al. | |
| 2013/0283087 A1 | 10/2013 | Behrendt et al. | |
| 2014/0081984 A1 | 3/2014 | Sitsky | |
| 2014/0164769 A1 | 6/2014 | D'Souza | |
| 2014/0189641 A1 | 7/2014 | Anderson et al. | |
| 2015/0347751 A1 | 12/2015 | Card et al. | |
| 2016/0088023 A1* | 3/2016 | Handa | G06F 17/30899 726/1 |
| 2016/0112375 A1 | 4/2016 | Cohen et al. | |
| 2017/0244723 A1 | 8/2017 | Prasad et al. | |
| 2017/0244760 A1 | 8/2017 | Prasad et al. | |

OTHER PUBLICATIONS

International Search Report and Written Opinion dated Feb. 16, 2017 in International Patent Application No. PCT/US2016/060605, 12 pages.

Roberts, Chris, "Cloud, Risk and Security", Sep. 10-12, Wellington, New Zealand, 65 pages.

Governance, Risk and Compliance (GRC) Framework, MetricStream White Papers, 21 pages. Available at: http://www.metricstream.com/whitepapers/html/GRC_frame.htm.

"Cloud Access Manager", Retrieved from: https://www.quest.com/documents/cloud-access-manager-datasheet-68555.pdf, Feb. 3, 2017, 3 Pages.

"Non Final Office Action Issued in U.S. Appl. No. 15/589,475", dated Aug. 10, 2018, 34 Pages.

"Non Final Office Action Issued in U.S. Appl. No. 15/589,486", dated Aug. 27, 2018, 45 Pages.

* cited by examiner

INCIDENT MANAGEMENT TO MAINTAIN CONTROL OF RESTRICTED DATA IN CLOUD COMPUTING ENVIRONMENTS

CROSS-REFERENCE TO RELATED APPLICATIONS

This application is related by subject matter to the following application: U.S. application Ser. No. 14/933,815, entitled MAINTAINING CONTROL OVER RESTRICTED DATA DURING DEPLOYMENT TO CLOUD COMPUTING ENVIRONMENTS, filed on even date herewith. The aforementioned application is assigned or under obligation of assignment to the same entity as this application, and is herein incorporated by reference in its entirety.

BACKGROUND

Cloud computing environments, including data centers, server farms and the like, have become increasingly common to provide vast amounts of computational and storage resources. For example, cloud computing environments have been utilized to store and retrieve vast amounts of data for various service applications (e.g., web applications, email services, search engine services, etc.). These networked systems typically include a large number of nodes distributed throughout one or more data centers, in which each node provides a physical machine or a virtual machine running on a physical host.

Due partly to the complexity and large number of the nodes that may be included within such cloud computing environments, resolving incidents and deploying software updates can be a time-consuming and costly process. Data control policies imposed on cloud computing environments also contribute to the challenges of incident management and deployment. In particular, many cloud computing environments are subject to data controls policies that limit who has access to certain data and to the control plane, which allows for implementing changes to the production environment (i.e., the physical and logical environment where cloud service infrastructure components providing services to customers are hosted). These data control policies may be driven by a variety of factors, such as, for instance, customer-driven requirements, laws, or industry best practices. Such data control policies may restrict a given cloud computing environment to certain service providing entities or personnel authorized to access certain data or the production environment, geographical boundaries, or certain logical or physical components within a given production environment. By way of example to illustrate, customers in highly regulated industries such as healthcare may require restriction of their computing environment to certain screened personnel. As another example, some customers may be subject to regulations that restrict the geographical boundaries in which cloud services are provided or where restricted data is stored, processed, or both. Such regulations may include the personnel authorized to have access to restricted data and to the control plane of the production environment. Complying with these data control policies poses challenges in how the cloud services are deployed and managed to maintain the control over the data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to resolving incidents in cloud computing environments subject to data control requirements, in a manner that maintains control of data. In accordance with embodiments, a cloud computing environment is operated by operating personnel who are authorized to have access to restricted data in the cloud service. However, the number and available expertise of the operating personnel may not be sufficient to handle all incidents faced by the cloud computing environment. Accordingly, techniques are provided herein that allow DevOps personnel to perform incident management on the cloud computing. The DevOps personnel do not have access to restricted data and do not have access to the control plane of the cloud computing environment that would allow the DevOps personnel to modify the cloud computing environment in a way that would give the DevOps personnel access to restricted data. The techniques include allowing for execution of automated operations in response to known incidents that do not require any involvement of the DevOps personnel to execute the automated operations. The techniques also include allowing for the execution of remote operations by the DevOps personnel in response to an incident without providing the DevOps personnel access to restricted data or the control plane of the cloud computing environment. The operating personnel may control whether the remote operations are executed and may redact data before any data is returned to the DevOps personnel. Another technique is to provide just-in-time (JIT) access to DevOps personnel to resolve an incident. The JIT access is limited to a certain level or type of access and is also limited in time such that the JIT access is revoked when a time period expires. A further technique for incident management is using an escort model, in which an escort session between operating personnel and DevOps personnel is established, and the escort session is connected to the production environment of the cloud computing environment. This gives the DevOps personnel access to the production environment during the escort session to troubleshoot an incident while the operating personnel tracks the escort session and can terminate the session as desired.

BRIEF DESCRIPTION OF THE DRAWINGS

The present invention is described in detail below with reference to the attached drawing figures, wherein.

DETAILED DESCRIPTION

Figure 1:
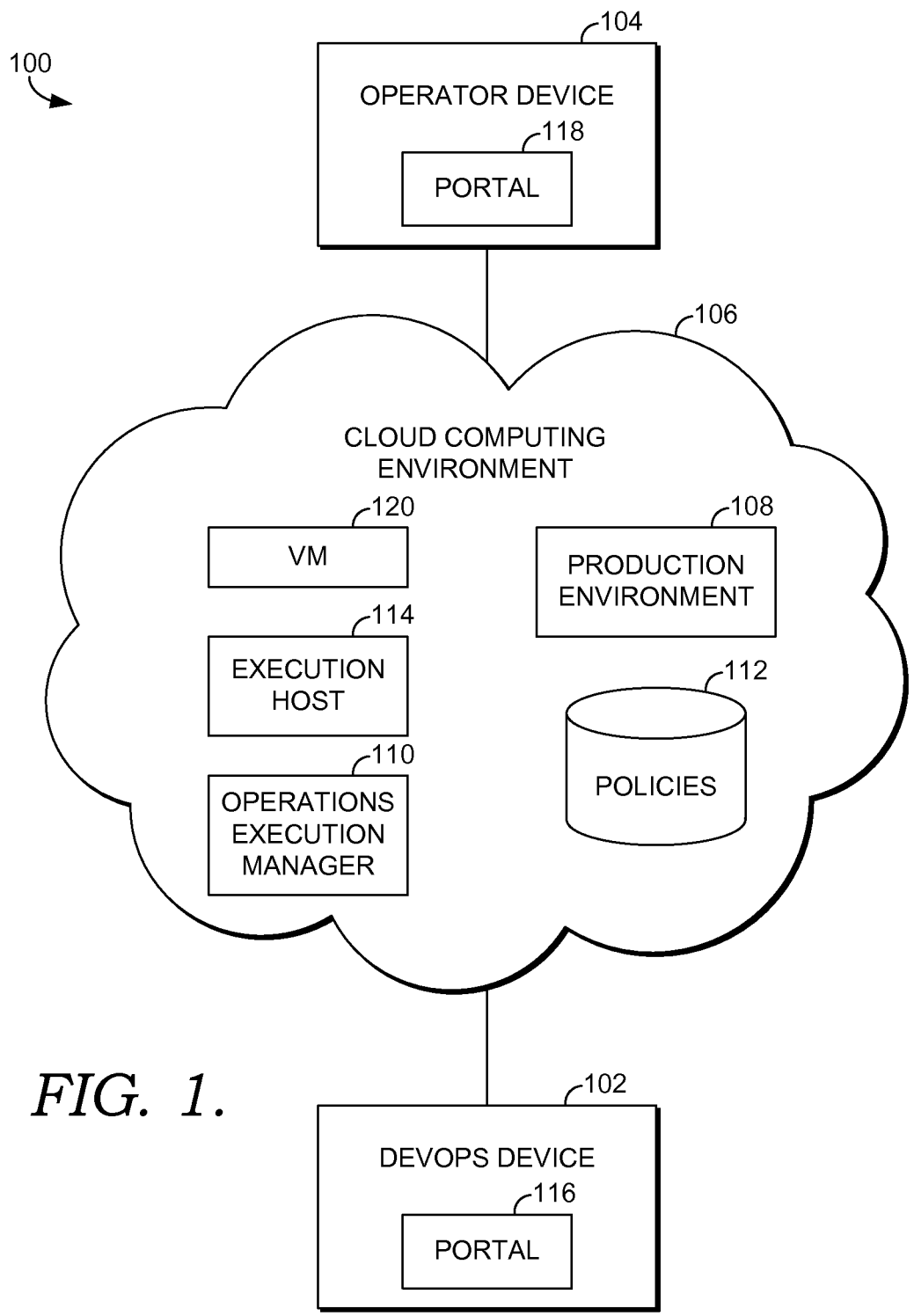
FIG. 1 is a block diagram showing a system for automated and/or remote execution of operations for incident management in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, data control policies on cloud computing environments often limit who has access to certain data and to the control plane to implement changes to the production environment (i.e., the physical and logical environment where cloud service infrastructure components providing services to customers are hosted). In accordance with some data control policies, data stored by a cloud service includes both non-restricted data and restricted data. While access to non-restricted data may be more generally available, access to restricted data is available only to individuals who satisfy the requirements dictated by the data control policies. As used herein, the term "operating personnel" is used to refer to the individuals who have persistent access to, and do not require pre-approval to access, restricted data. The individuals who are considered operating personnel may vary depending on the applicable data control policies of the cloud computing environment. By way of example only, operating personnel may be required to reside in the country at which the cloud computing environment is located and have passed screening requirements (e.g., background/security clearance checks). Operating personnel may be a third party entity, authorized personnel either within a given entity or across multiple entities. Operating personnel is typically defined by the cloud service provider, but in some instances, operating personnel may be defined by the customer.

As used herein, "restricted data" includes any data whose access is restricted to and/or controlled by operating personnel. By way of example only and not limitation, restricted data may include customer content/data, end user identifiable information, and access control data. Customer content is defined as content directly created by customer users and all data, including all text, sound, software or image files that customers provide, or are provided on customers' behalf, through use of the services. This includes but is not limited to: email body (full or partial), email attachment body, information in the body of a file, IM or voice conversations, customer generated blob or structured storage data, customer's binaries running in virtual machines, customer-owned security information/secrets (certificates, encryption keys, storage keys, customer address list data (name, email address(es), office address, phone numbers, manager/direct reports, job title, distribution group memberships), network packet payloads, database contents, service bus message contents, etc. End user identifiable information is defined as data unique to a user, or generated from their use of the service; is linkable to an individual user and does not include customer content. This includes but is not limited to: user specific Internet Protocol (IP) address, email address, email subject line or email attachment name, user name, display name, office number, employee ID, address book data, behavioral/usage data that is linkable to an individual user, location information, machine name, etc. Access control data is used to manage access to other types of data or functions within the environment, including access to customer content or end user identifier information. It includes passwords, security certificates, and other authentication-related data, such as: passwords to platform components; private keys of certificates used to manage platform components.

Alternatively, "non-restricted" data may be more generally accessible and not limited to access by operating personnel. By way of example only and not limitation, non-restricted data may include account/administrator data, payment data, organization identifiable information, and system metadata. Account/administrator data is information about administrators provided during sign-up, purchase, or administration of the services, such as: name of the customer company name (e.g. "Contoso"), Internet Domain Name of the customer (without user name; e.g. "contoso.cn"), customer company billing address, name, user name, email address of administrator of a service hosting a service, IP address of such an administrator's computer or of customer servers (i.e., not tied to end user), etc. Payment Data is information about payment instruments such as credit card details. It is subject to other security precautions but may not considered "restricted" for access restrictions addressed herein. Organization identifiable information is defined as data that can be used to identify a particular tenant (generally configuration or usage data), is not linkable to an individual user, and does not contain customer content. This may include: tenant ID, customer subscription IDs, aggregated behavioral/usage data associable with a tenant but not a user, tenant usage data, tenant IP addresses (e.g. IP Addresses associated with customer's virtual machines or on premise servers (but not individual end users), etc. System metadata comprises operations data, such as: service logs (provided they don't contain restricted data), technical information about a subscription (e.g. service topology), technical information about a tenant (e.g. customer role name), configuration settings/files, service status, performance metrics, IP addresses used for internet transit service (firewall, netflow, sflow), etc.

The data control policies limiting who can access restricted data and make certain changes to the production environment of cloud computing environments poses challenges to cloud service providers. In particular, operation of a cloud service requires managing incidents, which may include, for instance, maintenance tasks, deployment incidents, live site incidents, customer reported incidents, and support requests. Additionally, operation of a cloud service requires periodic updates and patches to be deployed to the production environment. In the context of a cloud computing environment in which access to restricted data and the control plane are limited to operating personnel, it may be difficult to properly provide incident management and software/firmware deployment as the number and available expertise of the operating personnel may not be sufficient to properly maintain the cloud computing environment.

Embodiments of the present invention are directed to technological improvements that allow a cloud service provider to employ DevOps personnel to facilitate incident management and software/firmware deployment in cloud computing environments while satisfying data control policies that govern the access to restricted data and the control plane of the cloud computing environments. As used herein, "DevOps personnel" include individuals from engineering teams of a cloud service provider (including subsidiaries, affiliates, vendors, etc.) who do not have access to "restricted data" and unlimited access to the control plane of a cloud computing environment. In some instances, the DevOps personnel may not reside within the country within which the cloud computing environment is located and may not be subject to the security screening requirements applied to the operating personnel.

In accordance with embodiments of the present invention, access control techniques are provided to allow the DevOps personnel to facilitate incident management and software/firmware deployment while ensuring that the DevOps personnel do not have the technical means to obtain unapproved access to restricted data or to the control plane to implement changes to the production environment of a cloud computing environment that would give the DevOps personnel the ability to access restricted data.

As will be described in further detail below, the access control techniques for incident management include allowing for execution of automated operations in response to known incidents that do not require any involvement of the DevOps personnel to execute the automated operations. The techniques also include allowing for the execution of remote operations by the DevOps personnel in response to an incident without providing the DevOps personnel access to restricted data in the cloud computing environment or to the control plane of the cloud computing environment. The operating personnel may control whether the remote operations are executed and may redact data before any data is returned to the DevOps personnel. Another technique is to provide just-in-time (JIT) access to DevOps personnel to resolve an incident. The JIT access is subject to review and approval by the operating personnel. Additionally, the JIT access is limited to a certain level or type of access and is also limited in time such that the JIT access is revoked when a time period expires. A further technique for incident management is using an escort model, in which an escort session between operating personnel and DevOps personnel is established, and the escort session is connected to the production environment of the cloud computing environment. This gives the DevOps personnel access to the production environment during the escort session to troubleshoot an incident while the operating personnel monitors the escort session and can terminate the session as desired.

Further embodiments ensure compliance with data control policies in the context of release deployments by requiring an operating personnel to authorize the deployments. In accordance with embodiments, a DevOps personnel is tasked with developing the release. However, the DevOps personnel is not authorized to deploy the release to the cloud computing environment. When completed, operating personnel who has access to restricted data and the right to modify the cloud computing environment is notified of the release and given release specifications providing details of the release. If the operator approves the release, the release is transferred to the cloud computing environment and a deployment engine automatically deploys the release to the production environment of the cloud computing environment.

Automated Execution and Remote Execution

Some embodiments of the present invention are directed to providing a control and command tool that allows for incident management operations to be performed on the production environment of a cloud computing environment at arm's length such that a DevOps personnel is not provided access to the production environment. As will be discussed in further detail below, this includes automated execution of operations, in which operations are automatically selected and executed on the production environment to resolve incidents in response to particular incident triggers. This also includes a portal that allows DevOps personnel to review incident information and select operations for execution on the production environment to resolve the incident. Some operations are considered "permitted operations" that may be executed without operating personnel approval. These include operations that will not expose any restricted data or allow the DevOps personnel to change the production environment to access restricted data. Other operations are considered "reviewable operations" that require the approval and/or oversight of operating personnel.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes a DevOps device 102, an operator device 104, and a cloud computing environment 106. It should be understood that the system 100 shown in FIG. 1 is an example of one suitable computing system architecture. Each of the components shown in FIG. 1 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of devices may be employed within the system 100 within the scope of the present invention. Each may comprise a single device or multiple devices cooperating in a distributed environment that collectively provide the functionality described herein.

Additionally, other components not shown may also be included within the network environment.

As shown in FIG. 1, the cloud computing environment 106 includes a production environment 108, which comprises the physical and logical environment where cloud service infrastructure components providing services to customers are hosted. This includes systems that store/process both restricted and non-restricted data. The cloud computing environment 106 also includes an operations execution manager 110, which is responsible for managing the execution of automated operations and remote operations submitted by DevOps personnel.

When an incident is identified, information regarding the incident is logged and provided to the operations execution manager 110. The operations execution manager 110 analyzes the incident information against policies 112, which include mappings of particular operations to particular triggers. The triggers may include any of a variety of information regarding the production environment 108 that may be reported with an incident. If the incident information includes information that matches a particular trigger in the policies 112, the automated operation or set of automated operations mapped to that trigger in the policies 112 is automatically executed on the production environment 108 by an execution host 114.

Automated operations may be mapped to triggers in the policies 112 in a number of different ways in accordance with embodiments of the present invention. In some instances, the mappings are manually generated by operating personnel and/or DevOps personnel. In other instances, the mappings are learned over time by collecting information regarding what operations are performed in response to various incidents. Machine learning is employed to analyze the collected information to determine with a threshold level of certainty which operations were successful to handle certain incidents.

In some embodiments, instead of automatically executing the identified operation(s), a recommendation may be provided to a DevOps personnel via a portal 116 accessed on the DevOps device 102. The DevOps personnel reviews the incident information and the recommended operation(s) and determines whether to execute the operation(s). This approach may be preferable in cases in which mappings are developed via machine learning analysis to ensure that the determined mappings are appropriate. Over time as confidence in a mapping reaches a certain level, the process may be automated as described above.

When an incident does not trigger any automated operations (or recommended operations), the incident information is provided to the portal 116 on the DevOps device 102. The incident information provided to the DevOps personnel only includes non-restricted data. The DevOps personnel may review the incident information and select one or more operation(s) to execute to address the incident. In some instances, a first group of permitted operations are available that may be remotely executed by the DevOps personnel without any approval from an operating personnel. These operations are ones that will not expose any restricted data to the DevOps personnel or allow the DevOps personnel to modify the production environment 108 in a way that allows the DevOps personnel to access restricted data. In some instances, a second group of reviewable operations are available that may be remotely executed by the DevOps personnel only after approval by an operating personnel. These include operations that have at least the potential to expose restricted data. In some embodiments, the permitted operations and reviewable operations may be set forth by the policies 112 for the cloud computing environment 106.

When a permitted operation or set of permitted operations are submitted by the DevOps personnel via the portal 116, the execution host 114 executes the operation(s) on the production environment 108. Alternatively, when a reviewable operation or set of reviewable operations are submitted by the DevOps personnel via the portal 116, the operation(s) are not automatically executed. Instead, information regarding the reviewable operation(s) is provided to the operating personnel via the portal 118 on the operator device 104. The operating personnel reviews and determines whether to allow execution of the operation(s). If the operation(s) is/are approved and executed, data returned from the operation(s) is initially provided to the operating personnel via the portal 118. The operating personnel may redact any restricted data, and the redacted data is provided to the DevOps personnel via the portal 116. This ensures that no restricted data is provided to the DevOps personnel.

In some embodiments, when operations are performed for debugging, a virtual machine 120 is initialized and used for debugging purposes. This ensures that restricted data does not leave the cloud computing environment. Instead, the DevOps personnel employs the portal 116 to remote into the virtual machine 120 to perform debugging.

Figure 2:
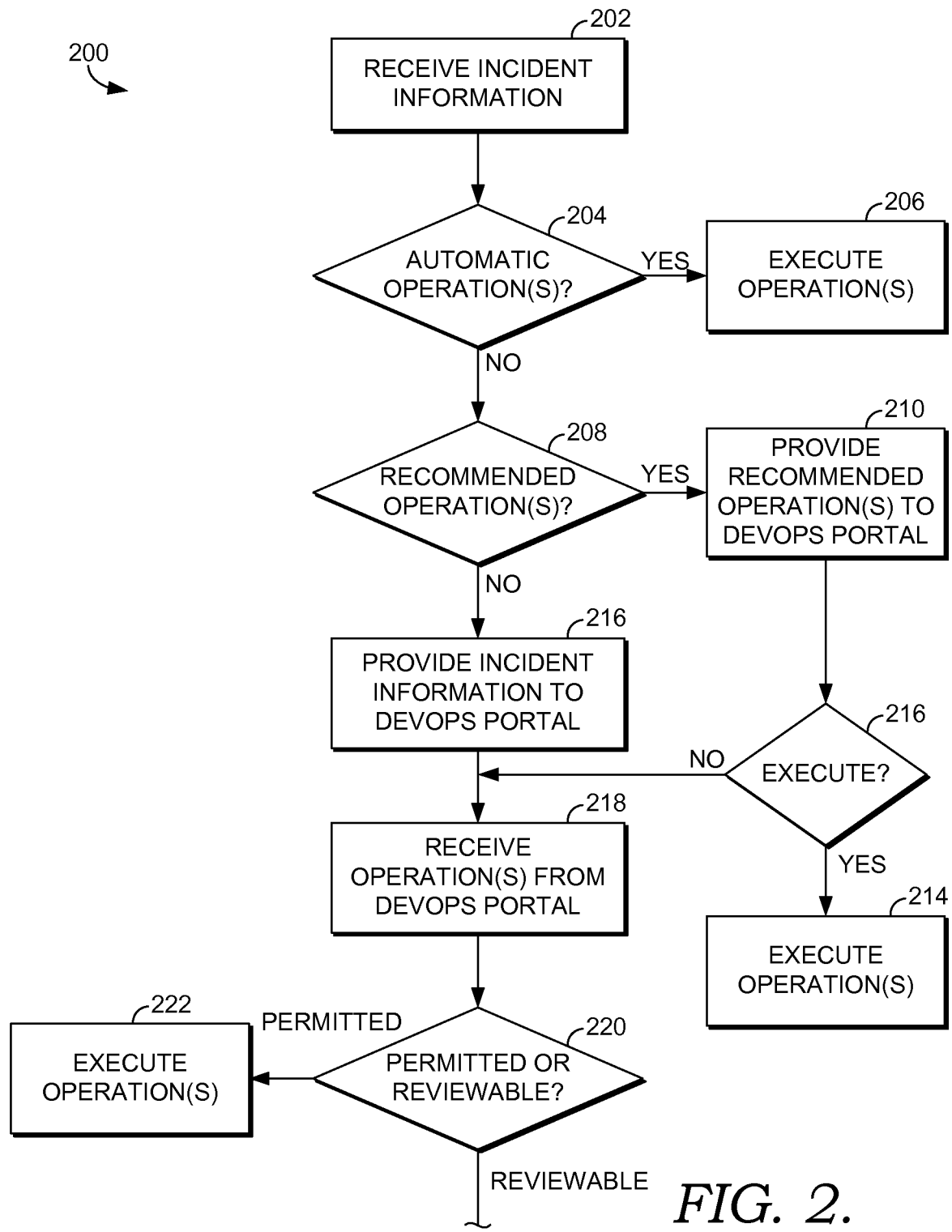
FIG. 2 is a flow diagram showing a method for incident management using automated and/or remote execution of operations in accordance with an embodiment of the present invention.
Figure 2:
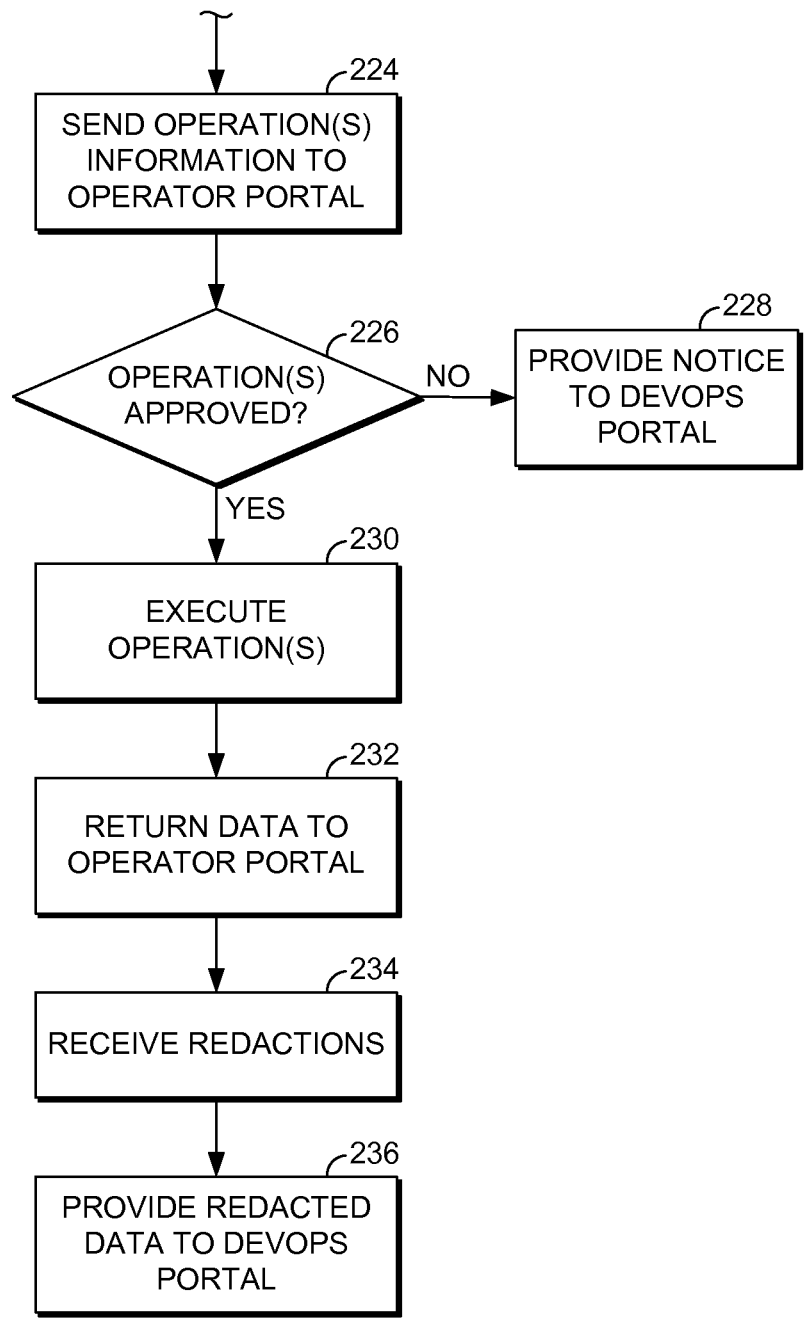

With reference now to FIG. 2, a flow diagram is provided that illustrates a method 200 for automated and/or remote execution of operations to resolve an incident in a cloud computing environment. Each block of the method 200 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 200 may be performed using a computing device, such as the computing device 900 of FIG. 9.

Initially, as shown at block 202, incident information is received and logged. The incident information is analyzed to determine if automatic operations are available, as shown at block 204. This may include comparing the incident information against policies that map incident triggers to particular automatic operations. If one or more automatic operations are identified based on the incident information, the automatic operation(s) is/are executed on the production environment, as shown at block 206. The automatic operations have been reviewed by operating personnel and pre-approved for autonomous execution in the cloud computing environment.

If no automatic operations are identified, the incident information is analyzed to determine if recommended operations are available, as shown at block 208. This may include comparing the incident information against policies that map incident triggers to particular recommended operations. If one or more recommended operations are identified based on the incident information, information regarding the incident with the recommended operation(s) is provided to the DevOps personnel, as shown at block 210. The DevOps personnel may review the incident information and recommended operation(s) to determine whether to execute the operation(s). Accordingly, if a command is received from the DevOps personnel at block 212 to execute the operation(s), the operation(s) is/are executed on the production environment, as shown at block 214. Alternatively, the DevOps personnel may decide to execute alternative operation(s) as shown by the progression to block 218.

If no automatic or recommended operations are identified, incident information is provided to the DevOps personnel, as shown at block 216. The DevOps personnel reviews the incident information, and one or more operation(s) are selected by the DevOps personnel, as shown at block 218. A determination is made at block 220 regarding whether the operation(s) include permitted or reviewable operation(s). If only permitted operation(s) is/are received, the operation(s) is/are executed, as shown at block 222. If any reviewable operation(s) is/are included, an identification of the operation(s) is/are sent to the operating personnel, as shown at block 224.

The operating personnel reviews the operation(s), and a command is received to approve or reject the operation(s), as shown at block 226. If rejected, a notice is provided to the DevOps personnel, as shown at block 228. Alternatively, if approved, the operation(s) are executed on the production environment, as shown at block 230. Data returned from the operation(s) is provided to the operating personnel, as shown at block 232, and redactions from the operating personnel are received, as shown at block 234. Access to the redacted data is then provided to the DevOps personnel, as shown at block 236. As noted previously, in some embodiments, operations on the production environment of a cloud computing environment are performed using a virtual machine within the cloud computing environment, and the DevOps engineer may remote into the virtual machine to perform debugging.

JIT Access

Some embodiments of the present invention are directed to providing DevOps personnel with just-in-time (JIT) access to the production environment of a cloud computing environment in order to perform incident management. This provides the DevOps personnel with access that is both limited in scope (i.e., the level of access permitted) as well as limited in time (i.e., the JIT access is revoked after a set period of time). As the data custodian/trustee of the cloud computing environment, the operating personnel may be given the ability to review a JIT access request from DevOps personnel and determine whether to grant or deny the requested access. JIT access allows DevOps personnel to be provisioned with near real time access to the production environment without providing the DevOps personnel persistent access to the production environment.

Figure 3:
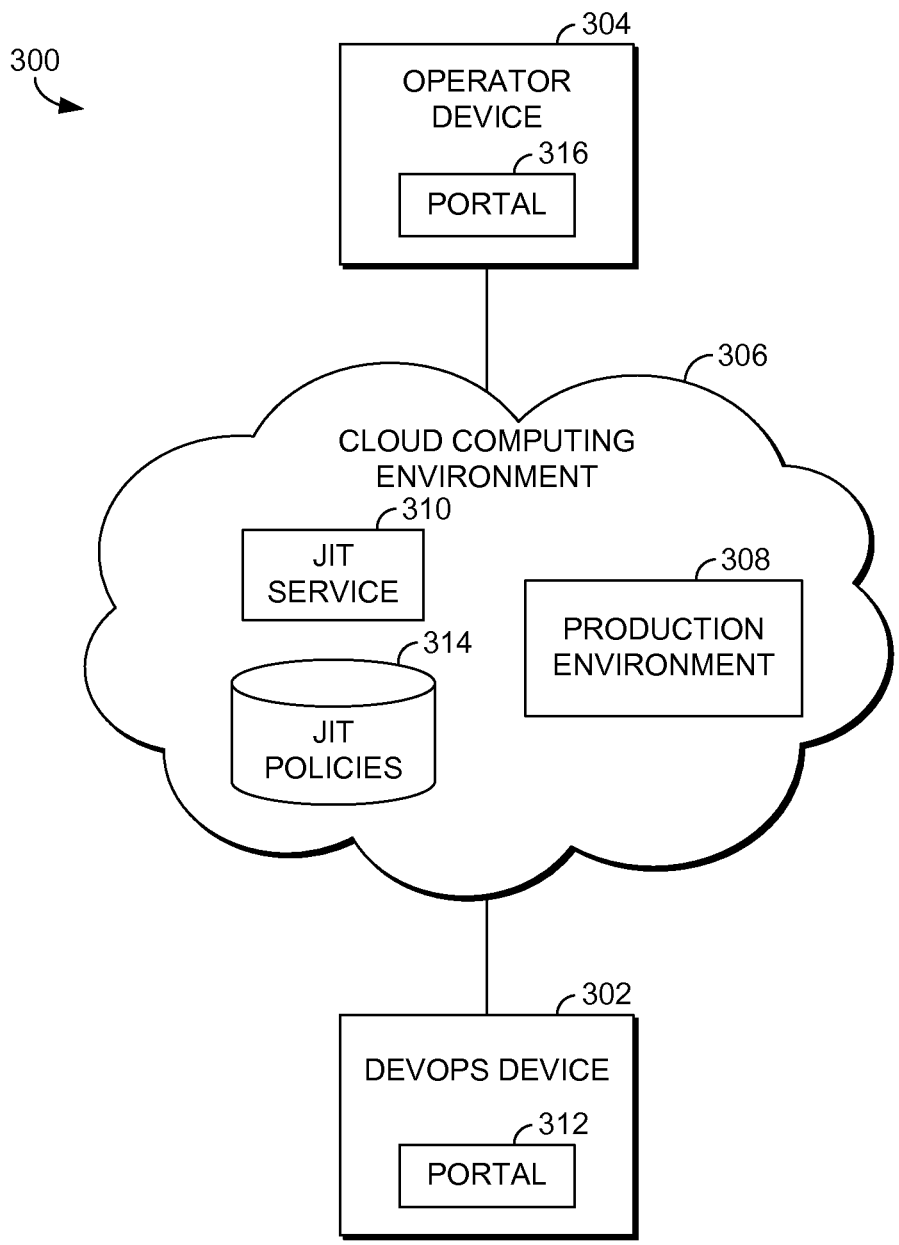
FIG. 3 is a block diagram showing a system for just-in-time access to a cloud computing environment for incident management in accordance with an embodiment of the present invention.

With reference to FIG. 3, a block diagram is provided illustrating an exemplary system 300 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 includes a DevOps device 302, an operator device 304, and a cloud computing environment 306. It should be understood that the system 300 shown in FIG. 3 is an example of one suitable computing system architecture. Each of the components shown in FIG. 3 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of devices may be employed within the system 300 within the scope of the present invention. Each may comprise a single device or multiple devices cooperating in a distributed environment that collectively provide the functionality described herein. Additionally, other components not shown may also be included within the network environment.

As shown in FIG. 3, the cloud computing environment 306 includes a production environment 308, which comprises the physical and logical environment where cloud service infrastructure components providing services to customers are hosted. This includes systems that store/process both restricted and non-restricted data. The cloud computing environment 306 also includes JIT service 310, which is responsible for handling JIT access for DevOps personnel.

When an incident occurs, incident information is logged and provided to the DevOps personnel via the portal 312 on the DevOps device 302. The incident information provided to the DevOps personnel only includes non-restricted data. The DevOps personnel reviews the incident information and determines that JIT access is required to resolve the incident. As such, the DevOps personnel employs the portal 312 to submit a JIT access request to the JIT service 310. The JIT access request may specify a number of parameters regarding the requested access. In various embodiments, the JIT access request specifies a particular level or type of access to a particular resource. The JIT access request also specifies the incident for which the JIT access is requested (e.g., via an incident number or other identifier).

When the JIT service 310 receives a JIT access request, the JIT service examines the request. Based on JIT policies 314 set for the cloud computing environment 306, some JIT access requests are automatically granted by the JIT service 310, while other JIT access requests are elevated for approval by operating personnel. Generally, the JIT service 310 examines the JIT access request against the JIT policies 314 to determine if the request is automatically granted. In this determination, the JIT service 310 may consider information, such as the DevOps personnel requesting the JIT access (team, role, etc.), whether there is an active incident, type of incident, and level/type of access requested.

If JIT access is automatically granted, a notice regarding the grant may be provided to the operating personnel via the portal 316 on the operator device 304. Alternatively, if JIT access is not automatically granted, the request is provided to the operating personnel via the portal 316. The operating personnel reviews the details of the JIT access request and determines whether to approve or deny the JIT access. In either case of automatic approval via the JIT service 310 or approval by the operating personnel, a time limit is set for the JIT access. The DevOps personnel may access the production environment according to the granted level/type of access. When the time limit expires, the JIT access is revoked. Alternatively, the DevOps personnel can select to revoke the JIT access if the access is no longer needed (e.g., the incident is resolved) before the time limit expires.

Figure 4:
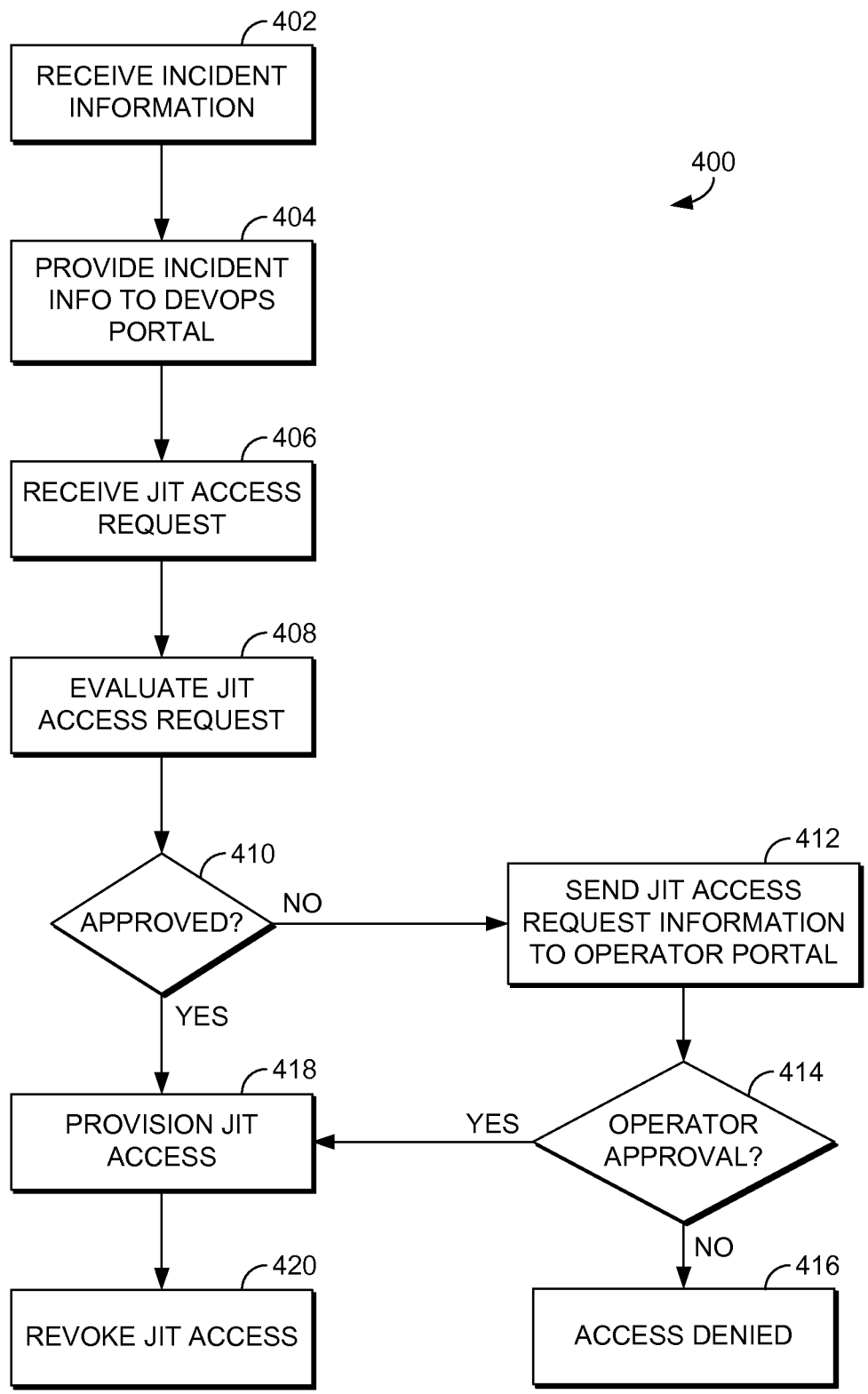
FIG. 4 is a flow diagram showing a method for incident management using just-in-time access to a cloud computing environment in accordance with embodiments of the present invention.

Turning now to FIG. 4, a flow diagram is provided illustrating a method 400 for providing DevOps personnel with JIT access to the production environment of a cloud computing environment. As shown at block 402, incident information is received and logged. The incident information is provided to the DevOps personnel, as shown at block 404. The DevOps personnel reviews the incident information and determines that JIT access is needed to access and resolve the incident. Accordingly, a JIT access request from the DevOps personnel is received, as shown at block 406. The JIT access request specifies a variety of information regarding the request, such as, for instance, information regarding the requesting DevOps personnel (e.g., team, role, etc.), whether an incident is identified, a type of incident, and the level/type of access requested.

The JIT access request is evaluated by the JIT service, as shown at block 408. For instance, details regarding the JIT access request may be compared against JIT policies for the cloud computing environment. Based on the evaluation, a determination is made at block 410 regarding whether the JIT access is automatically approved.

If the JIT access is not automatically approved, the JIT access request is sent to the operating personnel, as shown at block 412. The operating personnel reviews details of the JIT access request and determines whether to approve the request. Accordingly, a determination is made at block 414 regarding whether approval is received. If the JIT access is denied, a notice is sent to the DevOps personnel regarding the denial, as shown at block 416.

Alternatively, if the JIT access is automatically approved or approved by the operating personnel, the JIT access is provisioned for the DevOps personnel, as shown at block 418. This includes setting a time limit for the JIT access. The DevOps personnel then accesses the production environment in accordance with the approved JIT access to troubleshoot the incident. After the time limit expires, the JIT access is revoked, as shown at block 420. Alternatively, the operations personnel or DevOps personnel may select to revoke the JIT access before the time limit expires if the JIT access is no longer needed (e.g., the incident has been resolved).

Escort Model

Further embodiments of the present invention provide for an escort model for incident management in cloud computing environments. In accordance with the escort model, DevOps personnel is given access to the production environment of a cloud computing environment while an operating personnel serves as an escort during the session.

Figure 5:
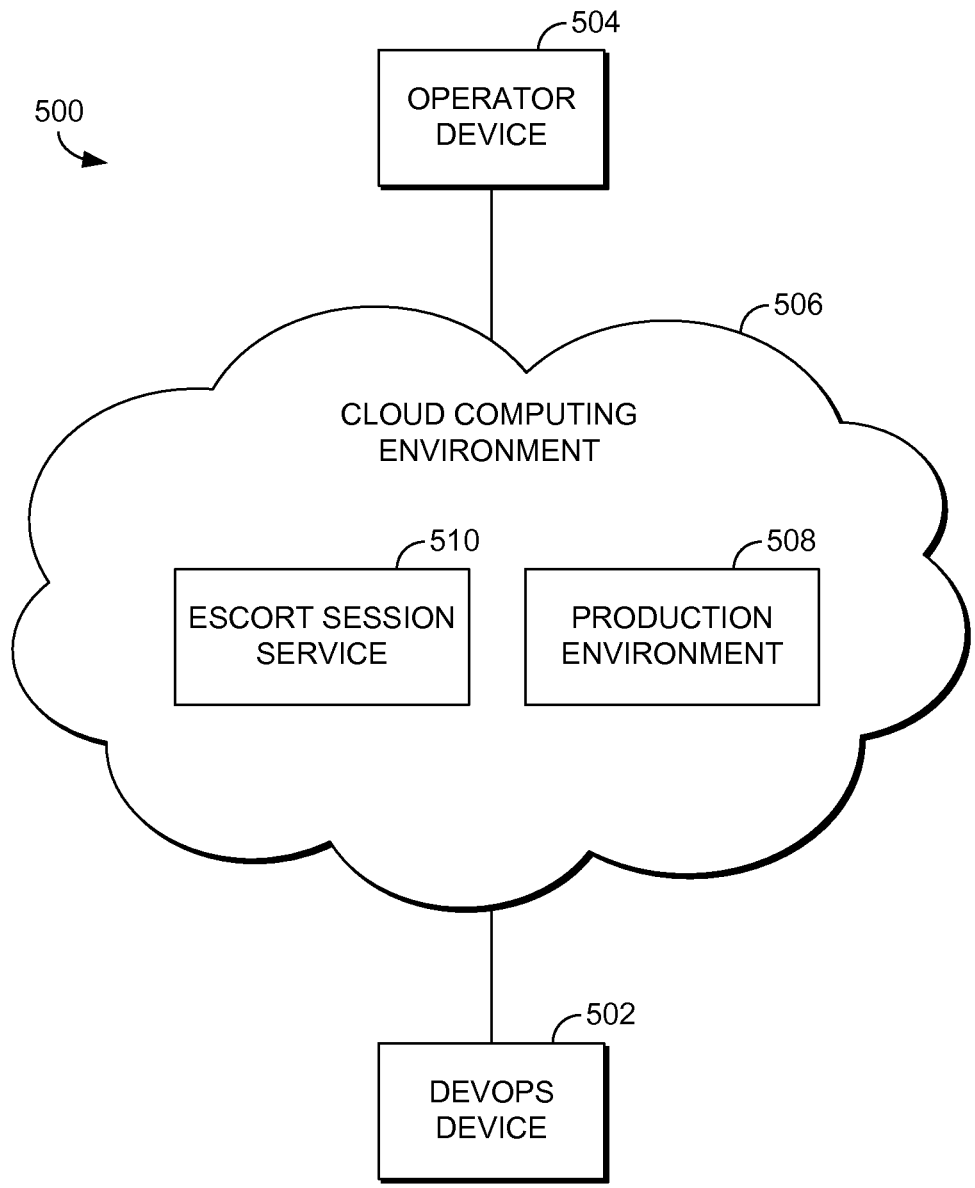
FIG. 5 is a block diagram showing a system for an escort session to a cloud computing environment for incident management in accordance with an embodiment of the present invention.

Referring to FIG. 5, a block diagram is provided illustrating an exemplary system 500 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 500 includes a DevOps device 502, an operator device 504, and a cloud computing environment 506. It should be understood that the system 500 shown in FIG. 5 is an example of one suitable computing system architecture. Each of the components shown in FIG. 5 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of devices may be employed within the system 500 within the scope of the present invention. Each may comprise a single device or multiple devices cooperating in a distributed environment that collectively provide the functionality described herein. Additionally, other components not shown may also be included within the network environment.

As shown in FIG. 5, the cloud computing environment 506 includes a production environment 508, which comprises the physical and logical environment where cloud service infrastructure components providing services to customers are hosted. This includes systems that store/process both restricted and non-restricted data. The cloud computing environment 506 also includes an escort session service 510, which is responsible for facilitating escort sessions.

When an incident occurs, incident information is logged and a determination is a made by DevOps personnel or operating personnel to use an escort session to troubleshoot the incident. The operating personnel employs the operator device 504 to connect to the escort session service 510 to initiate an escort session. Additionally, instructions are sent to the DevOps device 502 for the DevOps personnel to connect to the escort session service 510 to join the escort session. Using the instructions, the DevOps personnel employs the DevOps device 502 to join the escort session via the escort session service 510. Within the escort session provided by the escort session service 510, the operating personnel connects to the production environment 508 using the operating personnel's access credentials. The DevOps personnel and the operating personnel have parallel mouse and keyboard control over the escort session and view the same information from the production environment. As such, the DevOps personnel proceeds with troubleshooting the incident using the operating personnel's privileged access, while the operating personnel monitors the DevOps personnel's actions and may terminate the escort session as desired.

Figure 6:
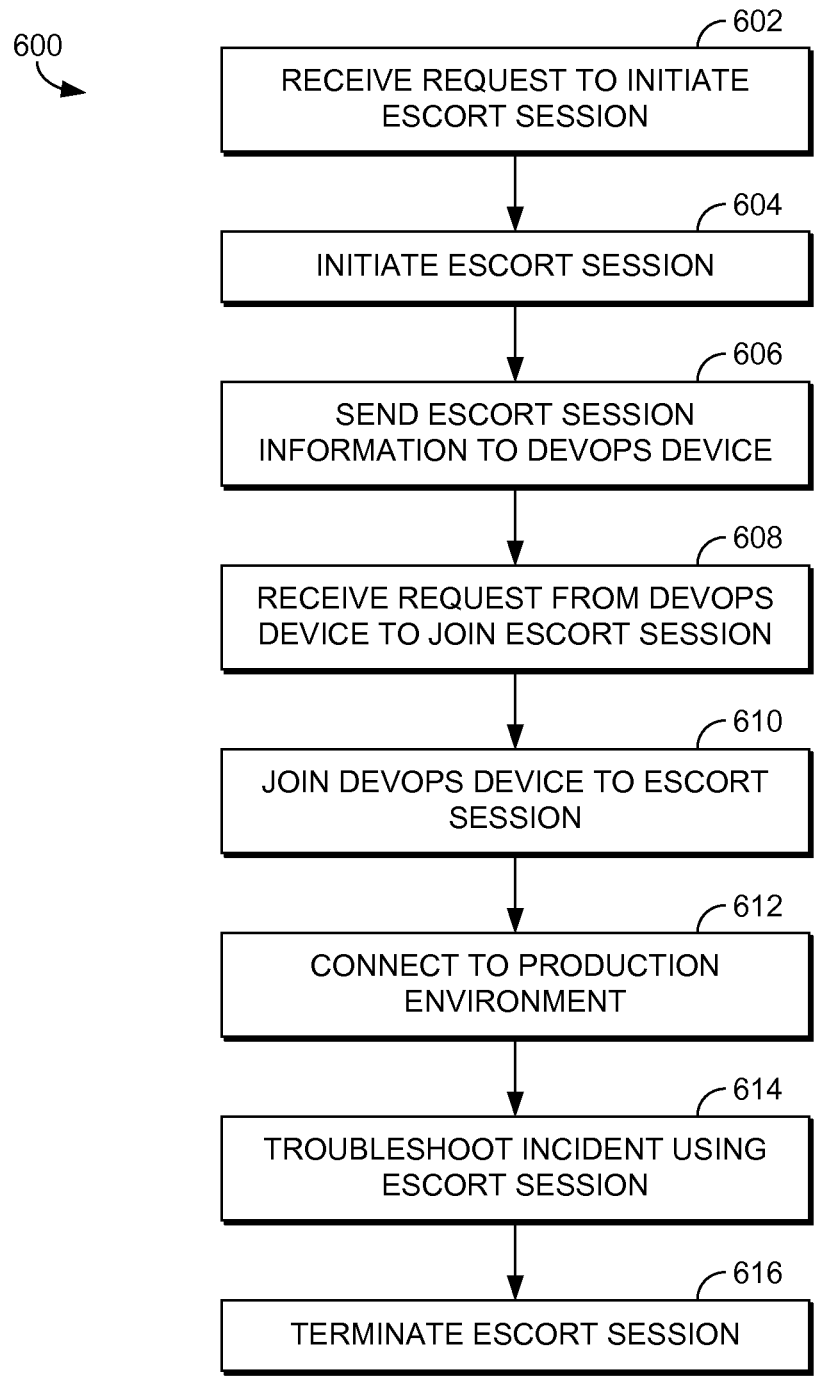
FIG. 6 is a flow diagram showing a method for incident management using an escort session to a cloud computing environment in accordance with embodiments of the present invention.

FIG. 6 is a flow diagram that illustrates a method 600 for performing an escort session. As shown at block 602, a request to initiate an escort session is received at an escort session service from an operating personnel's device. The request may be based on identification of an incident that requires an escort session to address the incident. In response to the request, an escort session is initiated, as shown at block 604. Additionally, escort session information is provided to allow the DevOps personnel to join the session, as shown at block 606. A request to join the escort session is received from the DevOps device based on the provided session information, as shown at block 608, and in response, the DevOps device is joined to the session at block 610.

The escort session is employed to connect to the production environment of the cloud computing environment, as shown at block 612, using the access credentials of the operating personnel. The session is then employed by the DevOps personnel to troubleshoot the incident given the access level of the operating personnel, as shown at block, 614. Additionally, the operating personnel monitors the DevOps personnel's actions during the escort session. When troubleshooting is complete or at any other time, the operating personnel may terminate the escort session, as shown at block 616.

Incident Management Using Combined Approaches

It should be noted that although the various incident management approaches are discussed above separate from one another, any combinations of the incident management approaches may be available at a cloud computing environment depending on the data control policies applicable to the cloud computing environment. For instance, a cloud computing environment could be provided that includes the components of the cloud computing environments 106, 306, and/or 506 shown in FIGS. 1, 3, and 5, respectively. The order in which incident management approaches are selected may also be dictated by the level of data security provided by each approach. For instance, an approach with a higher level of data security may initially be attempted to resolve an incident, and another approach with a comparatively lower level of data security is subsequently attempted if the first approach fails to resolve the incident.

Generally, automated and remote operation execution provides the highest level of data security because DevOps personnel are provided no access to the production environment. Instead, only operations may be submitted to the production environment, either automatically or via approval from the operating personnel. Additionally, operating personnel have the opportunity to review and returned data to redact any restricted data. JIT access provides a comparatively lower level of data security as the DevOps personnel are provided some level of access to the production environment. However, that level of access may be limited and the access is also limited in time. Escort sessions likely provide the lowest level of data security. In an escort model, DevOps personnel are granted the access level available to the operating personnel escorting the access. While the operating personnel are actively monitoring the session and may terminate the session if needed, if restricted data is returned during the session, the DevOps personnel may be able to at least momentarily view the restricted data.

Deployment

Another area presenting a potential issue for the data control policies of cloud computing environments is the deployment of releases (e.g., software/firmware update, patches, etc.) to the production environment. In particular, if DevOps personnel is tasked with the development of releases for the production environment, it is important to ensure that the releases do not make changes that would allow DevOps personnel access to restricted data. Accordingly, some embodiments are directed to techniques that facilitate the deployment of releases developed by DevOps personnel in a manner that prevents such changes. As will be discussed in further detail below, any release must be approved by operating personnel before deployment. If approved by operating personnel, a release is then automatically deployed to the production environment. As such, the operating personnel is not required to deploy the release but may control the deployment.

Figure 7:
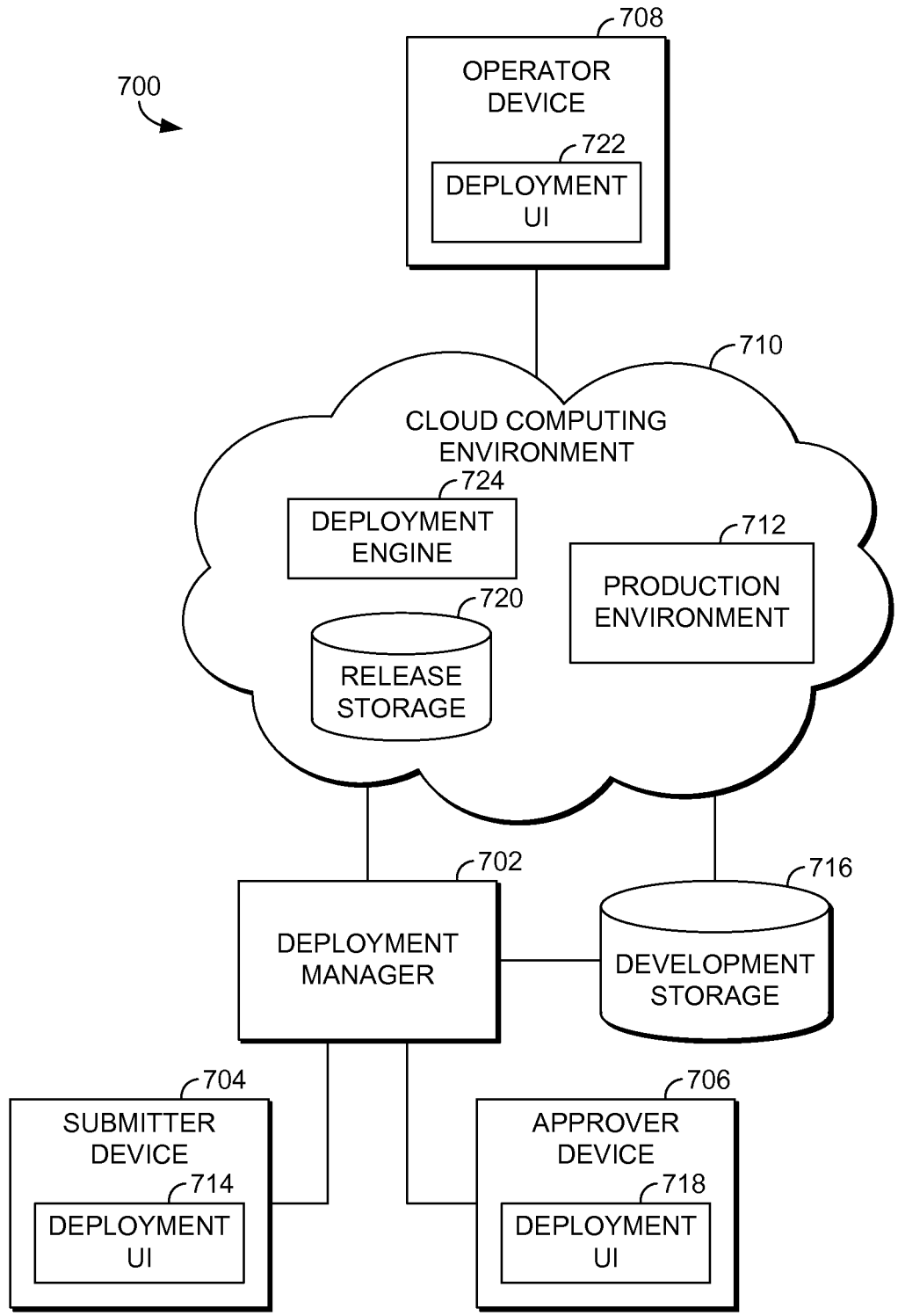
FIG. 7 is a block diagram showing a system for an deploying a release to the production environment of a cloud computing environment in accordance with an embodiment of the present invention.

FIG. 7 is a block diagram illustrating an exemplary system 700 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 700 includes a deployment manager 702, a submitter device 704, an approver device, an operator device 708, and a cloud computing environment 710. It should be understood that the system 700 shown in FIG. 7 is an example of one suitable computing system architecture. Each of the components shown in FIG. 7 may be implemented via any type of computing device, such as computing device 900 described with reference to FIG. 9, for example. The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of devices may be employed within the system 700 within the scope of the present invention. Each may comprise a single device or multiple devices cooperating in a distributed environment that collectively provide the functionality described herein. Additionally, other components not shown may also be included within the network environment.

The deployment manager 702 generally operates to facilitate the development of releases by DevOps personnel, the submission of releases to the cloud computing environment 710, and the deployment of the releases to the production environment 712. Using a deployment UI 714 on a submitter device, DevOps personnel tasked with developing releases author and submit releases to the deployment manager 702. Releases are stored in an associated development storage 716 during development. For a given release, the submitting DevOps personnel authors release specifications that describe the release with sufficient detail for operating personnel to understand what is being deployed. The release specifications may be stored in the development storage 716 in association with the release.

In some embodiments, a release requires approval by DevOps personnel before submitting the release to the cloud computing environment 710. When the submission of a release to the deployment manager 702, the deployment manager 702 notifies an approver DevOps personnel. The approver DevOps personnel employ a deployment UI 718 on the approver device 706 to review and approve the release.

Once a release is approved by approver DevOps personnel, a notification is provided to operating personnel to review the release. The operating personnel employs the deployment UI 722 on the operator device 708 to access and review the release specifications. As such, the operating personnel ensures that the release will not make changes to the production environment 712 that would allow DevOps personnel to access restricted data. The operating personnel then employs the deployment UI 722 to either approve or disapprove the release.

If the release is approved by the operating personnel, the release is transferred from the development storage 716 to a release storage 720 in the cloud computing environment 710. A deployment engine 724 in the cloud computing environment 710 automatically deploys the release to the production environment 712. No action other than approval is required from the operating personnel to deploy the release. During deployment, operating personnel may view the deployment status for the release using the deployment UI 722. Additionally, the operating personnel may cancel, restart, or resume the deployment via the deployment UI 722. DevOps personnel may also view the status of the deployment via deployment UIs (e.g., deployment UI 714, 718). However, DevOps personnel may not be given the ability to cancel, restart, or resume the deployment.

Figure 8:
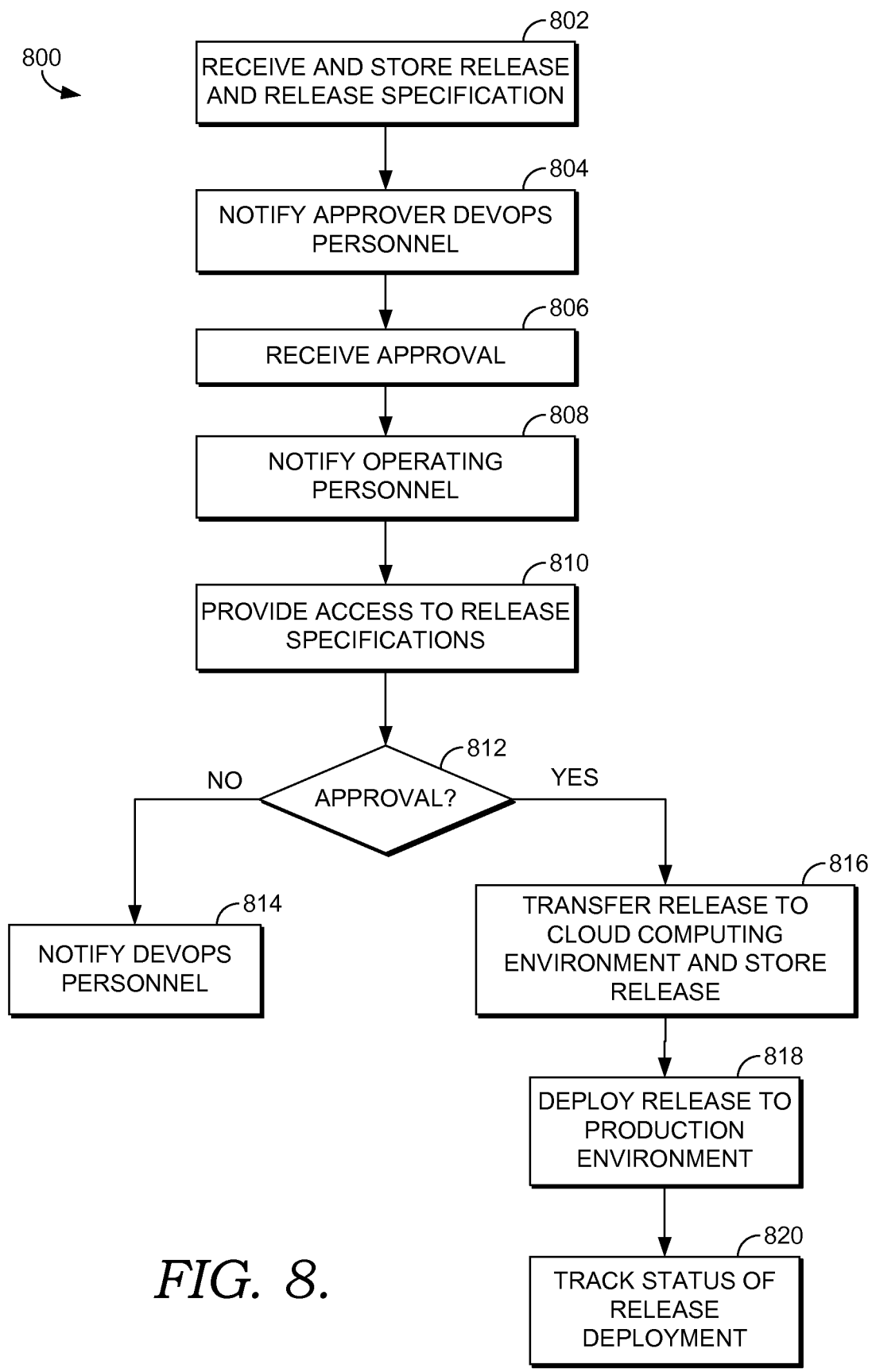
FIG. 8 is a flow diagram showing a method for deploying a release to the production environment of a cloud computing environment in accordance with embodiments of the present invention.

Turning now to FIG. 8, a flow diagram is provided illustrating a method 800 for deploying a release to the production environment of a cloud computing environment. As shown at block 802, a release and release specifications are received from DevOps personnel and stored. As noted above, the release specifications describe the release with sufficient detail for operating personnel to understand the release and ensure that the release will not provide DevOps personnel with access to restricted data. An approver from the DevOps personnel is notified of the release, as shown at block 804. The approver reviews the release and/or release specifications and approves the release, as shown at block 806.

In response to the approval from the approver DevOps personnel, operating personnel are notified of the release, as shown at block 808. Access to the release specifications are provided to the operating personnel, as shown at block 810. The operating personnel reviews the release specifications and selects whether to approve or disapprove the release. This gives the operating personnel the opportunity to ensure that the release will not make changes to the cloud computing environment that would provide DevOps personnel the ability to access restricted data.

A determination is made at block 812 regarding whether the operating personnel approves the release. If the release is disapproved, a notification of the disapproval is provided to the DevOps personnel, as shown at block 814. Alternatively, if it is determined that the release is approved, the release is transferred to the cloud computing environment and stored within the cloud computing environment, as shown at block 816. The release is automatically deployed to the production environment of the cloud computing environment using a deployment engine, as shown at block 818. The status of the deployment is tracked, as shown at block 820. As such, the operating personnel and/or DevOps personnel may review the status of the deployment. Additionally, the operating personnel may cancel, restart, or resume the deployment.

General Operating Environment

Figure 9:
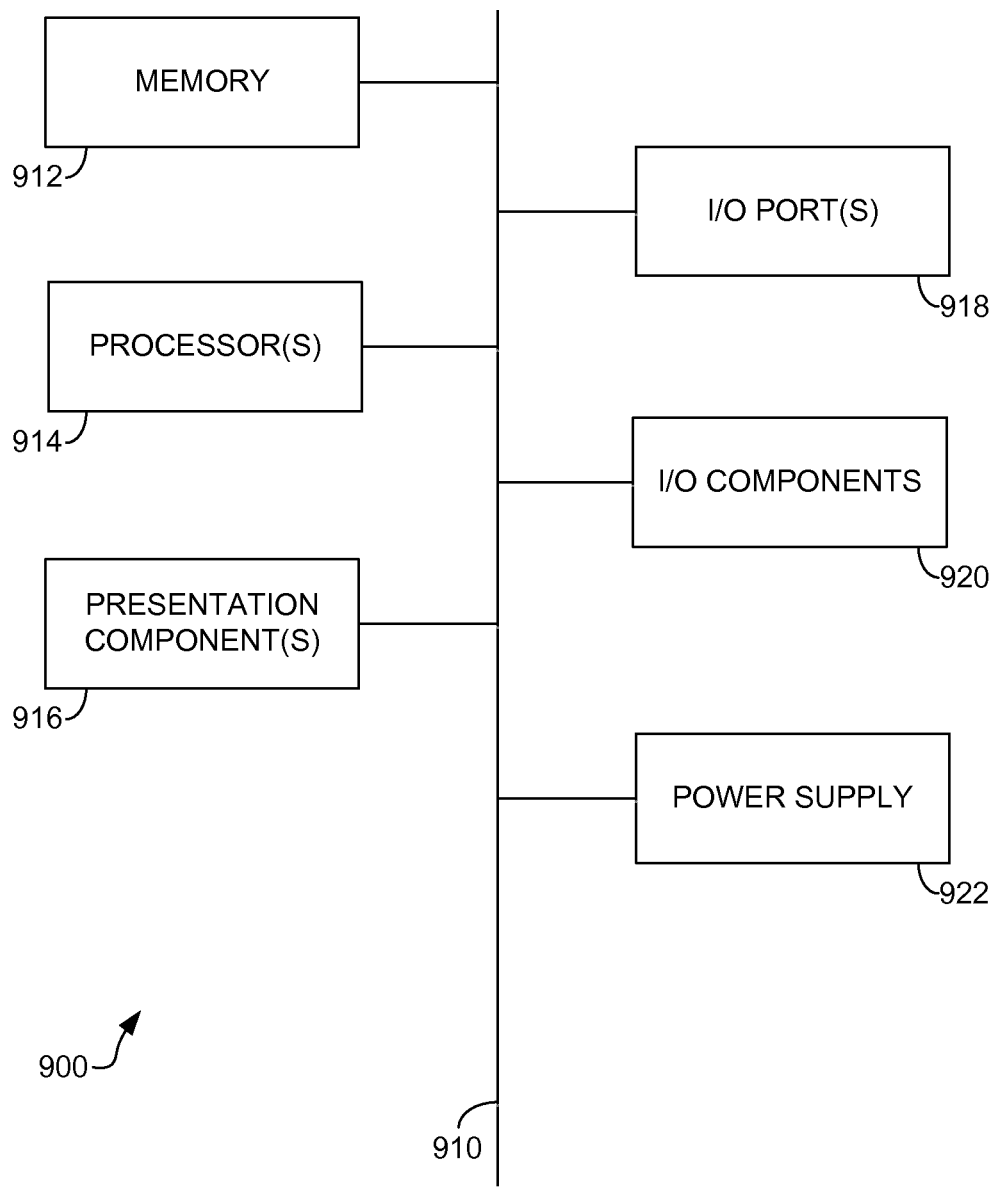
FIG. 9 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention are generally directed to providing for incident management and release deployment for a cloud computing environment in a manner that maintains control over restricted data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving incident information regarding an incident in a cloud computing environment;
   providing the incident information to a portal on a DevOps device for review by a DevOps personnel who does not have persistent access to restricted data in the cloud computing environment;
   receiving, at a service within the cloud computing environment, a request for a just-in-time (JIT) access session to access a resource in a production environment of the cloud computing environment from the portal on the DevOps device, wherein the request specifies request parameters including a level or type of access requested and information regarding the incident including a type of the incident and whether the incident is active;
   accessing, from a database of JIT policies stored in the cloud computing environment for a plurality of resources within the production environment of the cloud computing environment, a JIT policy for the resource specified by the request, the JIT policy stored in the database for processing by the service within the cloud computing environment to allow the service to automatically determine whether to grant JIT access to the resource; determining, by the service within the cloud computing environment, whether to approve the request for the JIT access session based at least in part on automatically evaluating the request parameters using the JIT policy for the resource to determine whether the level or type of access requested is automatically approved depending on the type of the incident and whether the incident is active;
   if it is determined to approve the request for the JIT access session, provisioning JIT access for the DevOps personnel including setting a time limit for the JIT access; and
   if it is determined to not approve the request for the JIT access session, providing a notice to the portal on the DevOps device.

2. The one or more computer storage media of claim 1, wherein the request for the JIT access session specifies at least one selected from the following: information regarding the DevOps personnel and an identification of the incident.

3. The one or more computer storage media of claim 2, wherein the information regarding the DevOps personnel identifies a role of the DevOps personnel.

4. The one or more computer storage media of claim 1, wherein the JIT access session is revoked when the time limit for the JIT access expires.

5. The one or more computer storage media of claim 1, wherein the JIT access session is revoked in response to a command from the DevOps personnel during the JIT access session.

6. The one or more computer storage media of claim 1, the operations further comprising:
   if it is determined to approve the request for the JIT access session, providing a notice regarding approval of the request to operating personnel having persistent access to restricted data.

7. The one or more computer storage media of claim 1, the operations further comprising:
   if it is determined to not approve the request for the JIT access session, sending the request for the JIT access session to operating personnel having persistent access to restricted data.

8. A computer-implement method comprising:
   receiving incident information regarding an incident in a cloud computing environment;
   providing the incident information to a portal on a DevOps device for review by a DevOps personnel who does not have persistent access to restricted data in the cloud computing environment;
   receiving, at a service within the cloud computing environment, a request for a just-in-time (JIT) access session to access a resource in a production environment of the cloud computing environment from the portal on the DevOps device, wherein the request specifies request parameters including a level or type of access requested and information regarding the incident including a type of the incident and whether the incident is active;

accessing, from a database of JIT policies stored in the cloud computing environment for a plurality of resources within the production environment of the cloud computing environment, a JIT policy for the resource specified by the request, the JIT policy stored in the database for processing by the service within the cloud computing environment to allow the service to automatically determine whether to grant JIT access to the resource;

determining, by the service within the cloud computing environment, whether to approve the request for the JIT access session based at least in part on automatically evaluating the request parameters using the JIT policy for the resource to determine whether the level or type of access requested is automatically approved depending on the type of the incident and whether the incident is active;

if it is determined to approve the request for the JIT access session, provisioning JIT access for the DevOps personnel including setting a time limit for the JIT access; and if it is determined to not approve the request for the JIT access session, providing a notice to the portal on the DevOps device.

9. The method of claim 8, wherein the request for the JIT access session specifies at least one selected from the following: information regarding the DevOps personnel and an identification of the incident.

10. The method of claim 9, wherein the information regarding the DevOps personnel identifies a role of the DevOps personnel.

11. The method of claim 8, wherein the JIT access session is revoked when the time limit for the JIT access expires.

12. The method of claim 8, wherein the JIT access session is revoked in response to a command from the DevOps personnel during the JIT access session.

13. The method of claim 8, the method further comprising:
if it is determined to approve the request for the JIT access session, providing a notice regarding approval of the request to operating personnel having persistent access to restricted data.

14. The method of claim 8, the method further comprising:
if it is determined to not approve the request for the JIT access session, sending the request for the JIT access session to operating personnel having persistent access to restricted data.

15. A system comprising:
one or more hardware processors; and
one or more computer storage media storing computer-usable instructions that, when used by the one or more processors, cause the one or more processors to:
receive incident information regarding an incident in a cloud computing environment;
provide the incident information to a portal on a DevOps device for review by a DevOps personnel who does not have persistent access to restricted data in the cloud computing environment;
receive, at a service within the cloud computing environment, a request for a just-in-time (JIT) access session to access a resource in a production environment of the cloud computing environment from the portal on the DevOps device, wherein the request specifies request parameters including a level or type of access requested and information regarding the incident including a type of the incident and whether the incident is active;
access, from a database of JIT policies stored in the cloud computing environment for a plurality of resources within the production environment of the cloud computing environment, a JIT policy for the resource specified by the request, the JIT policy stored in the database for processing by the service within the cloud computing environment to allow the service to automatically determine whether to grant JIT access to the resource;
determine, by the service within the cloud computing environment, whether to approve the request for the JIT access session based at least in part on automatically evaluating the request parameters using the JIT policy for the resource to determine whether the level or type of access requested is automatically approved depending on the type of the incident and whether the incident is active;
if it is determined to approve the request for the JIT access session, provision JIT access for the DevOps personnel including setting a time limit for the JIT access; and
if it is determined to not approve the request for the JIT access session, provide a notice to the portal on the DevOps device.

16. The system of claim 15, wherein the request for the JIT access session specifies at least one selected from the following: information regarding the DevOps personnel and an identification of the incident.

17. The system of claim 16, wherein the information regarding the DevOps personnel identifies a role of the DevOps personnel.

18. The system of claim 15, wherein the JIT access session is revoked when the time limit for the JIT access expires.

19. The system of claim 15, wherein the JIT access session is revoked in response to a command from the DevOps personnel during the JIT access session.

20. The system of claim of claim 15, the instructions further causing the one or more processors to:
if it is determined to approve the request for the JIT access session, provide a notice regarding approval of the request to operating personnel having persistent access to restricted data; and
if it is determined to not approve the request for the JIT access session, send the request for the JIT access session to operating personnel having persistent access to restricted data.

\* \* \* \* \*